Patented Feb. 19, 1929.

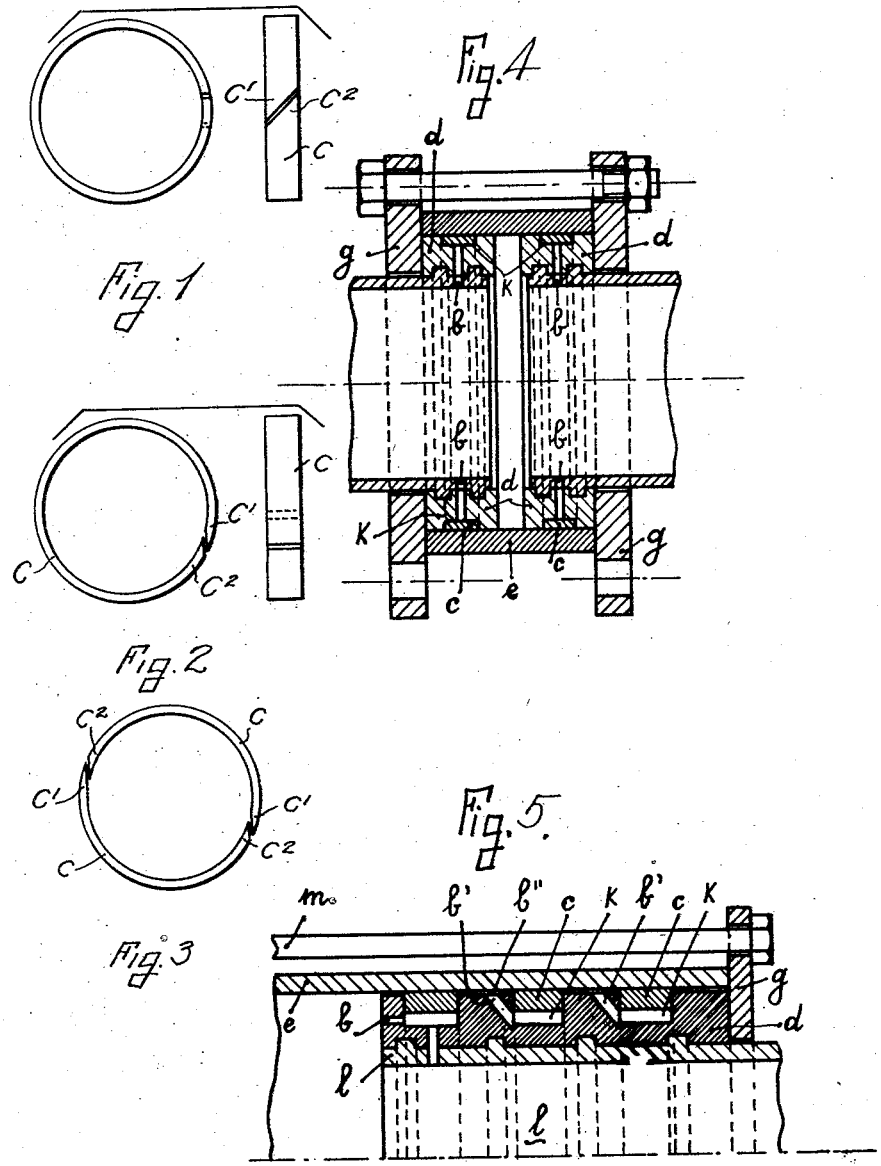

1,703,018

UNITED STATES PATENT OFFICE.

SIMON JOSEPH STIENNON, OF SERAING SUR MEUSE, NEAR LIEGE, BELGIUM.

PACKING DEVICE FOR PIPE JOINTS.

Application filed January 29, 1926, Serial No. 84,670, and in Belgium February 2, 1925.

The present invention relates to improvements in packing devices for pipe joints,—in which the tightness is obtained by fluid pressure acting upon a desired number of packings, whereby said packings are pressed against the adjoining face or faces.

It is evident that the necessary pressure may be produced by the fluid, the escapement of which is to be obviated, or by means of a compressed fluid taken from an independent source.

The principal object of the present invention consists in that the packing or packings are constituted each by a simple thin strip or strips of compressible material, for instance of leather, hemp, india rubber, compressed asbestos, lead, copper or any other suitable compressible material, the ends of such strip being cut to any suitable shape as illustrated in Figures 1, 2 and 3, so as to be in overlapping contact in actual use.

The great advantages of such strips, as distinguished from the endless ring of compressible material heretofore used, are that they are very cheap of manufacture, easily obtained or made for any diameter of pipe, and make a smooth tight packing without the formation of folds or wrinkles, and they can be applied and removed without separating or in any manner moving either of the pipes of the joint, since in using them it is not necessary to fit them over the end or ends of one or both of the pipes and move them endwise, but it is easy to merely wrap them around the pipe at the proper point or points in the usual packing groove or grooves.

With the foregoing and other objects in view which will appear from the following description, the invention resides in the combination and arrangement of parts and in the details of construction hereinafter described and claimed, it being understood that changes in the precise embodiment of the invention can be made, without departing from the spirit of the invention.

In the accompanying drawings:

Figure 1 represents, in edge view and in side view, a packing according to my invention and comprising a single strip of compressible material having its ends in contact in overlapping relation and cut on a slant in an axial direction;

Figure 2, similar views of a slightly different form of a single strip packing wherein the overlapping ends are also in contact, but beveled or cut on a slant excentric to its axis;

Figure 3, an edge view of a further modification employing two strips arranged end to end in a circle with the ends of the one in contact with, and in overlapping relation to, the ends of the other, said ends being beveled or cut, however, in the same form as shown in Figure 2;

Figure 4, a longitudinal sectional view of a pipe joint packing embodying my invention; and Figure 5, a fragmentary sectional view of a modified form of pipe joint embodying my invention and very similar to the form shown in Figure 4.

According to Figures 1, 2 and 3 the packing proper consists of one or two simple and thin strips $c$, of any suitable compressible material, the extremities $c^1$, $c^2$ of such strips being cut in such a form as in use to be in overlapping contact to constitute in operation an endless band having a smooth endless exterior face in contact at all points of its periphery with the opposed face of the sleeve $e$ or by superposition (see Figures 2 and 3), or in any other convenient manner.

According to Figure 4, the adjacent end portions of pipes $f$ and $l$ which are to be connected together, are provided each with a fixed circular flange $d$, each of said flanges being provided with a circular groove $k$, this latter communicating through a passage $b$, with the interior of the corresponding pipe. Each of the grooves $k$ contains a packing $c$ (see Figures 1, 2). Said parts are enclosed by a cylindrical sleeve $e$, the whole being assembled by means of annular flanges $g$ and bolts $m$. The compressed fluid within the piping presses the packings $c$ against the cylindrical inner face of sleeve $e$ and the lateral faces of grooves $k$.

The modification illustrated in Figure 5 is in all respects, as to construction and operation, the same as the form illustrated in Figure 4, except in the following respects. Each annular flange $d$ of the pipes $f$ and $l$ is provided with a plurality of circular grooves $k$ in series, each of these grooves containing a packing $c$ as in Figure 4. However, only one of the grooves $k$ of this embodiment, the groove nearest the inner end of the corresponding flange, communicates directly with the interior of its corresponding pipe through the passages $b$, the remaining grooves $k$ having communication, by passages $b'$ extending through its radially inner wall and on a slant through the material of said flange to a point between the particular groove $k$ and the next adjacent groove nearer the inner end of the flange $d$, with the annular space between the outer face of the particular flange $d$, the opposed inner face of the sleeve $e$, and the packing strips $c$ respectively in said adjacent grooves $k$. Thus, any leakage of fluid which may work past an inner packing $c$ is arrested by the next adjacent packing $c$, said packings $c$ being pressed, as operatively endless bands, by the radially outward expanding action of the compressed fluid against the opposed inner confining face of the removable sleeve $e$ and, by virtue of their transverse expansion, also against the lateral faces of their respective grooves $k$.

The pipes $f$, $l$ may be assembled in the manner shown, that is to say, by means of flanges $g$ and bolts $m$, or in any other well known manner.

In assembling the pipes, the sleeve $e$ is first slid over and behind one of the flanges $d$. Then the packing strip or strips $c$ are wrapped about the flanges $d$ in their respective grooves $k$, the sleeve $e$ being successively slid over the respective grooves $k$ as the wrapping therein of the respective packing strips $c$ is accomplished, until the application of the packing strips $c$ to the respective grooves $k$ of the respective flanges $d$ is completed, when said flanges $d$ will be completely contained within the sleeve $d$, which serves to confine the packing strips $c$, as wrapped, in their respective grooves $k$. Thereafter the pipes are connected to each other by means of flanges $g$ and bolts $m$, or equivalent means, as above mentioned. In the event of renewing the packing strips $c$, or one of them, the bolts $m$ are unscrewed, and the sleeve $e$ is moved axially to uncover the groove or grooves $k$ wherein the packing is to be removed and replaced by new packing strips $c$, this being accomplished without any occasion to in any degree move or disturb either of the pipes $f$ and $l$ with relation to each other or to any other part or mounting and of course after such renewal of packing is completed the sleeve $e$ is moved axially to its normal position and the flanges $g$ and bolts $m$ are again connected and tightened up as before.

What I claim is:

1. A pipe joint comprising two pipes having their ends in adjacency, an annular flange arranged on each of the adjacent end portions of said pipes, each said flange being formed with an annular groove in its peripheral face and each said flange and its pipe being formed to permit direct communication between the interior of said pipe and the groove in said flange, a sleeve arranged about said pipes at their adjacent ends and presenting a smooth inner cylindrical wall in opposition to the peripheral faces of said flanges, and means for confining said adjacent end portions in said sleeve, in combination with packings respectively arranged in the grooves of the respective flanges, each said packing comprising a split band of compressible material wrapped about said flanges in said grooves to prevent formation of wrinkles and folds and having overlapping ends in contact to operatively constitute an endless packing band, and adapted to be acted upon by the pressure of the fluid in said pipes to be radially expanded thereby in opposition to the confining action of the cylindrical opposed inner face of said sleeve.

2. A pipe joint comprising two pipes having their ends in adjacency, an annular flange arranged on each of the adjacent end portions of said pipes, a sleeve and means for confining said pipe end portions in said sleeve, each said flange being formed with a plurality of annular grooves in its peripheral face, each said flange and its pipe being formed to permit direct communication between the interior of said pipe and one of said grooves, and said flange being formed to afford direct communication between the radially inner portions of each of the other of its grooves and the annular space between said flange and sleeve, and said sleeve presenting a smooth cylindrical wall in opposition to the peripheral faces of said flanges and acting to confine the packing in the respective grooves against radial expansion, in combination with packings respectively arranged in the grooves of the respective flanges, each said packing comprising a split band of compressible material with overlapping ends having their opposed faces in contact and operatively presenting a continuous smooth peripheral face in uninterrupted contact with the opposing face of said sleeve at all points about the common axis of the respective flanges.

In testimony whereof, I have signed my name to this specification at Antwerp, Belgium, this 14th day of January, 1926.

SIMON JOSEPH STIENNON.